(12) United States Patent
Carpenter (10) Patent No.: US 8,408,656 B2
(45) Date of Patent: Apr. 2, 2013

(54) HARNESS COVER FOR A CHILD RESTRAINT SYSTEM

(75) Inventor: Jason A. Carpenter, Denver, PA (US)

(73) Assignee: Graco Children's Products Inc., Atlanta, GA (US)

( * ) Notice: Subject to any disclaimer, the term of this patent is extended or adjusted under 35 U.S.C. 154(b) by 321 days.

(21) Appl. No.: 12/758,728

(22) Filed: Apr. 12, 2010

(65) Prior Publication Data

US 2011/0156469 A1  Jun. 30, 2011

Related U.S. Application Data

(60) Provisional application No. 61/291,647, filed on Dec. 31, 2009.

(51) Int. Cl.
*A47D 15/00* (2006.01)
(52) U.S. Cl. .......................................... 297/468; 297/483
(58) Field of Classification Search .................. 297/484, 297/468, 250.1
See application file for complete search history.

(56) References Cited

U.S. PATENT DOCUMENTS

| | | | |
|---|---|---|---|
| 5,294,183 A | 3/1994 | Wetter et al. | |
| 5,388,743 A * | 2/1995 | Silagy | 224/264 |
| 5,507,422 A * | 4/1996 | Shields | 224/264 |
| 6,318,609 B1 * | 11/2001 | Swierz | 224/264 |
| 6,457,774 B2 * | 10/2002 | Baloga | 297/250.1 |
| 7,448,522 B2 * | 11/2008 | Collier et al. | 224/264 |
| 7,552,969 B2 * | 6/2009 | Maciejczyk | 297/250.1 |
| 2008/0265653 A1 | 10/2008 | Wetter | |

FOREIGN PATENT DOCUMENTS

| | | |
|---|---|---|
| EP | 1 737 710 | 5/2009 |
| WO | WO 2005/092677 | 10/2005 |

* cited by examiner

*Primary Examiner* — David Dunn
*Assistant Examiner* — Erika Garrett
(74) *Attorney, Agent, or Firm* — Lempia Summerfield Katz LLC (57) ABSTRACT

A harness system for a child seat has a shoulder strap, a chest clip, and a harness cover. The harness cover has an upper section coupled to the shoulder strap and positioned above the chest clip and a lower section coupled to the shoulder strap and positioned below the chest clip.

20 Claims, 7 Drawing Sheets

FIG. 9

HARNESS COVER FOR A CHILD RESTRAINT SYSTEM

RELATED APPLICATION DATA

This patent claims the priority benefit of U.S. provisional patent application Ser. No. 61/291,647, filed on Dec. 31, 2009 and entitled "Harness Cover for Child Restraint System". The entire disclosure of this prior application is hereby incorporated by reference in its entirety.

BACKGROUND OF THE INVENTION

1. Field of the Disclosure

The present disclosure is generally directed to child restraint systems, and more particularly to a child restraint system with a chest clip and harness cover arrangement for use on a child seating device such as a child safety seat or car seat.

2. Description of Related Art

Child restraint systems that are integral with a car seat (or other seating device) typically have shoulder straps that run upward along the chest of a seat occupant and over the shoulders to the seat back of the seat. During a vehicle crash, the shoulder straps of a car seat can move laterally relative to the child's shoulders. Such relative movement can sometimes be excessive, which can negatively affect the performance of the child seat restraint system. When the restraint system, and particularly the shoulder straps of the system, maintains a correct position relative to the occupant, containment is improved. This improves the safety characteristics and crash performance of the seat.

It is known in the U.S. to utilize a chest clip to interconnect the two shoulder straps across the chest of a seat occupant. Chest clips are typically slidably adjustable along the shoulder straps. The chest clip helps to hold the shoulder straps in position and maintain lateral spacing, once properly positioned on the child and once the restraint system is properly tensioned. It is also known to use harness covers that are slidably attached to the restraints, one to each of the shoulder straps. Harness covers are typically positioned near or over the top of the shoulder of the seat occupant, sometimes to increase the comfort of the child as well as to assist in retaining the straps on the occupant's shoulders. Harness covers are more commonly used on car seats found outside of the U.S., such as in Europe, where chest clips and the like are not employed. Harness covers can be made from a rubber-like material on at least the surface which contacts the seat occupant, and/or a soft material to provide a cushion between the shoulder straps and the seat occupant. These features are often used to help contain the seat occupant and reduce the likelihood of the shoulder straps slipping off of the shoulders of the seat occupant during use, and particularly during a crash.

Others have tried to address the issue of shoulder strap movement in a restraint harness. In one example, U.S. Patent Publication No. 2008/0265653 discloses projections of varying height added to the wearer's side of the straps to help prevent a child's torso from bending forward during an accident.

In another example, U.S. Pat. No. 5,294,183 discloses a shock absorber in the form of a crushable pad with a tether to secure the pad. The pad is added to a restraint harness between the shoulder strap and the shoulder of a wearer. The tether is separable to permit movement of the pad with the wearer in the event of an accident.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed restraint systems and harness covers solve or improve upon the problem of shoulder straps sliding out of position on a child seated in a seating device. The disclosed restraint system employs two harness covers and a chest clip on the shoulder straps of the system. The harness covers are mounted to the shoulder straps behind, or underlying, and straddling the chest clip. The chest clip components can be adjustable over the length of the shoulder straps along with the harness cover. The disclosed harness covers can replace existing harness covers when used in conjunction with a chest clip device to tie the shoulder straps together. The harness covers disclosed herein can assist in properly positioning both the chest clip and the harness covers when a child is secured in a car seat or other seating device.

The disclosed child restraint system achieves the benefits of using both a chest clip and harness covers without imparting any significant disadvantage to the system. The chest clip ties the shoulder straps together, which helps to retain appropriate spacing to inhibit the shoulder straps from slipping off the shoulders of the seat occupant. The harness covers help to reduce slippage between the strap webbing and the seat occupant during use. Applying the two solutions in combination and in parallel helps to assure that each is properly positioned on the shoulder straps and/or the seat occupant.

Figure 1:
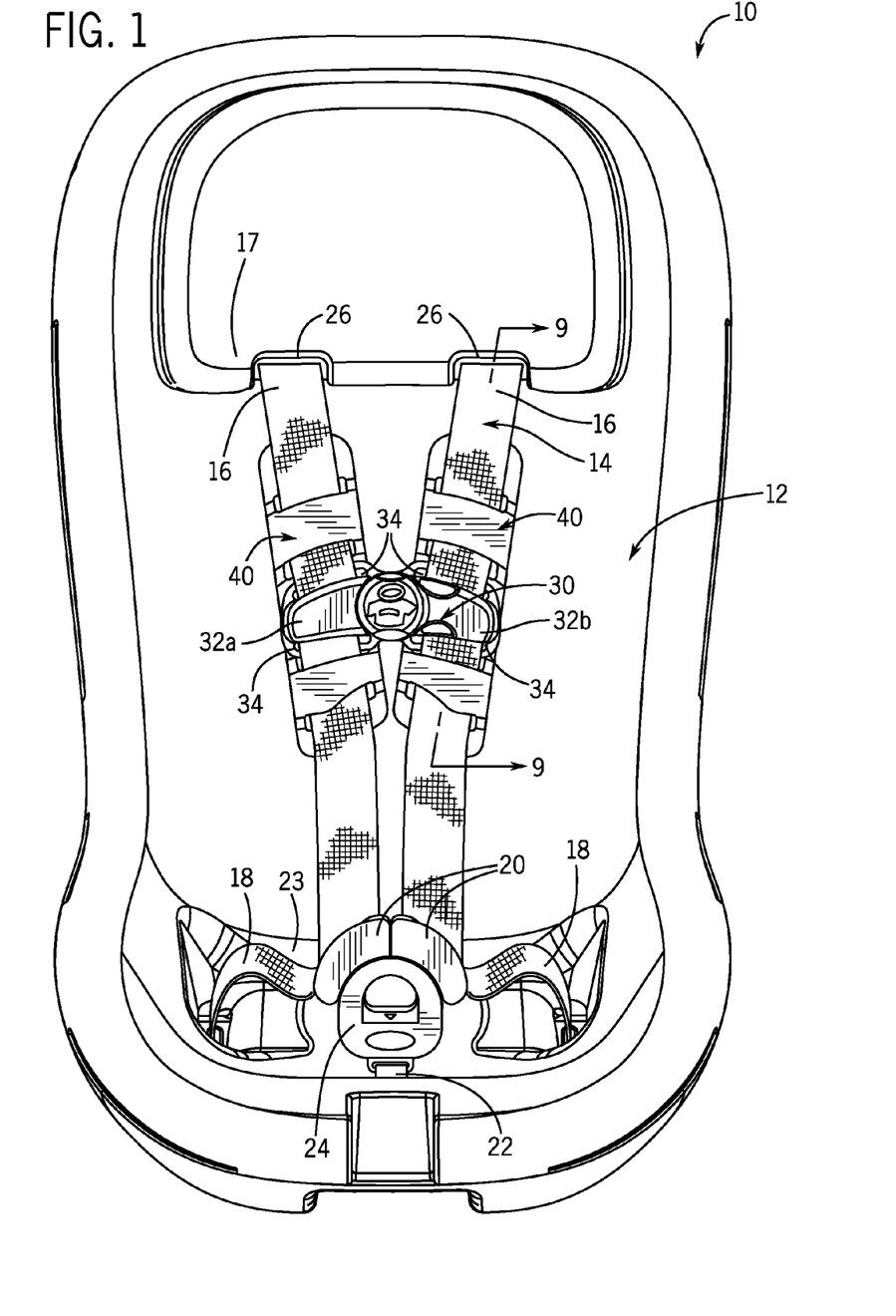
FIG. 1 shows a front view of a child's car seat with one example of a harness cover on a restraint system according to the teachings of the present invention.

Turning now to the drawings, FIG. 1 shows one example of a child seating device, such as a car seat 10. The car seat 10 has a seating area 12 and a restraint system 14 in accordance with the teachings of the present invention. The restraint system 14 has a pair of harness straps each with a shoulder strap 16 projecting forward and downward over the seating area 12 from a seat back 17 of the seat. The restraint system 14 also has a pair of lap belts 18. In this example, the lap belts 18 are continuous with the shoulder straps 16. Slidable connectors 20 are carried on each of the harness straps of the restraint system 14 and delineate or distinguish each shoulder strap 16 from the corresponding lap belt 18. Additionally, the restraint system has a crotch belt 22 extending upward from a seat bottom 23 of the seat 10. The crotch belt 22 has a buckle housing 24 on a free end of the crotch belt. The connectors 20 latch to the buckle housing 24 to form a five-point harness configuration of the child restraint system 14.

Figure 2:
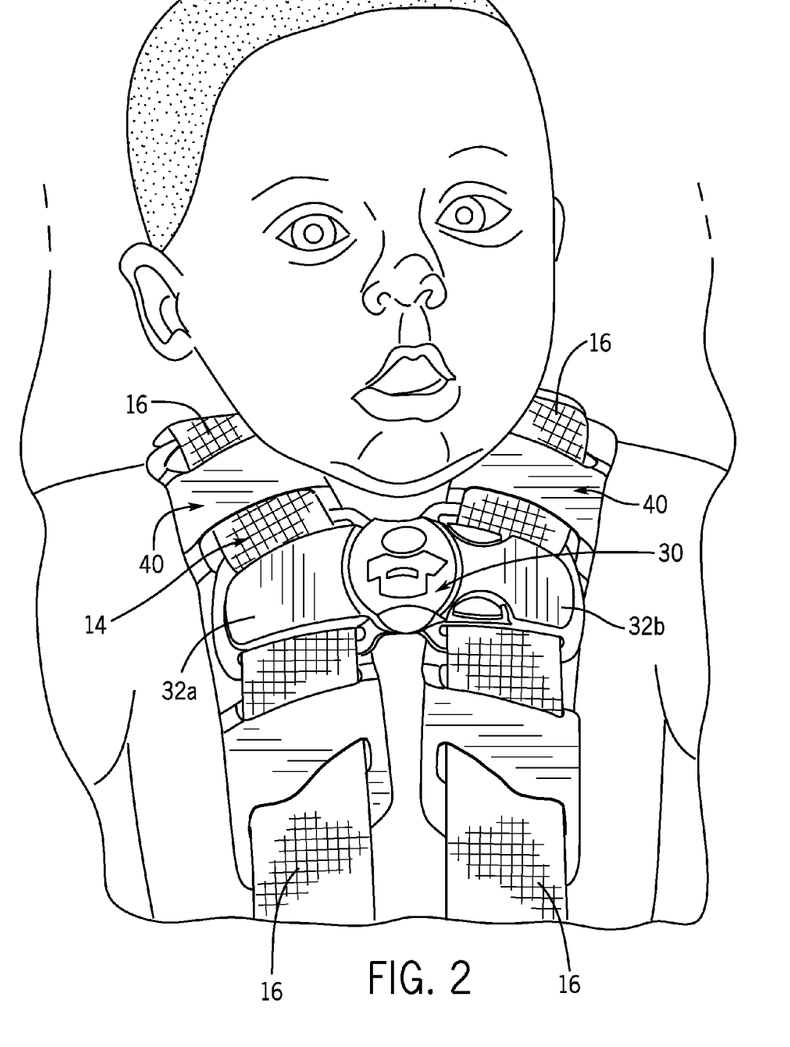
FIG. 2 shows a front view of a portion of the restraint system shown in FIG. 1 and secured over a child in the car seat.

Also shown in FIG. 1, a chest clip 30 is positioned between a top 26 of the shoulder straps 16 and the connectors 24. One example of a harness cover 40 in accordance with the teachings of the present invention is also depicted on the restraint system 14. The restraint system 14, as shown in FIGS. 1 and 2, includes two of the harness covers 40. Each harness cover 40 is positioned on a respective one of the shoulder straps 16 and is positioned beneath or underlying part of the chest clip 30. FIG. 2 illustrates a child restrained in the car seat 10 by the restraint system 14. In general, the chest clip 30 and the two harness covers 40 of the restraint system are arranged in parallel such that the chest clip 30 overlies and is straddled by the two harness covers 40. As shown, the harness covers 40 in this example are positioned at least partially over the shoulders of the child.

Figures 3, 4, 6:
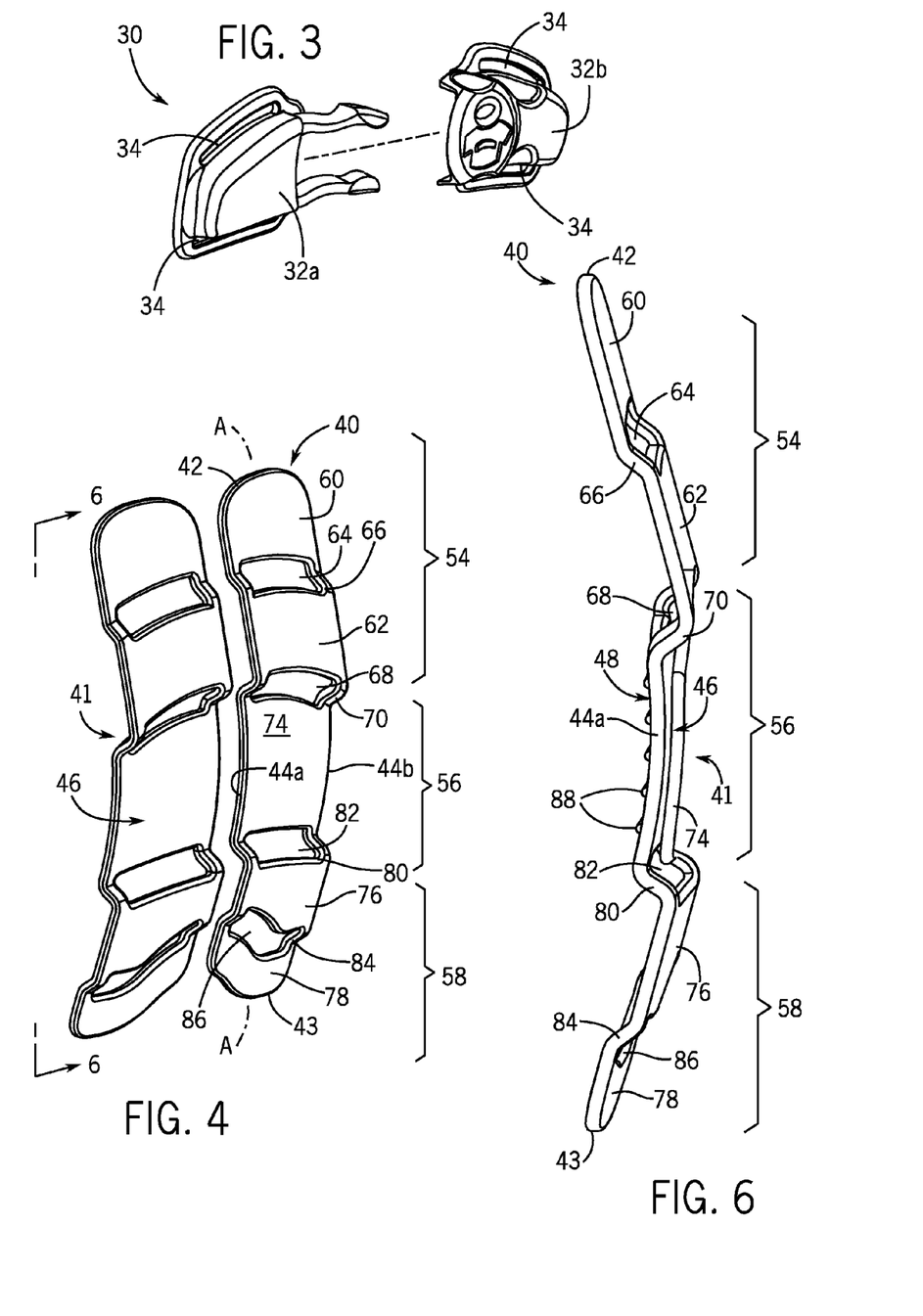
FIG. 3 shows an exploded perspective view of chest clip components of the restraint system shown in FIGS. 1 and 2.
FIG. 4 shows a front perspective view of only the harness cover of the restraint system shown in FIGS. 1 and 2.
FIG. 6 shows a side view of one of the harness covers viewed in the direction of lines 6-6 shown in FIG. 4.

The chest clip 30 has two chest clip components 32a and 32b as shown in FIG. 3. The components 32a, 32b each have one end that can attach to and detach from a mating part of the other component. When attached, the two components 32a, 32b interconnect the shoulder straps 16, as is known in the art, and define and retain a lateral spacing between the shoulder straps. The shoulder straps 16 are threaded through chest clip slots 34 in the opposite, non-attachable ends of the clip components 32a, 32b. The disclosed chest clip 30 can alternatively be replaced by another type of clip or harness tie. FIG. 3 illustrates each of the chest clip components 32a, 32b as detached or separated from one another. The two chest clip components 32a, 32b attach and detach as is known in the art. The chest clip components 32a, 32b are each carried on a respective shoulder strap 16 as shown in FIGS. 1 and 2.

Figure 5:
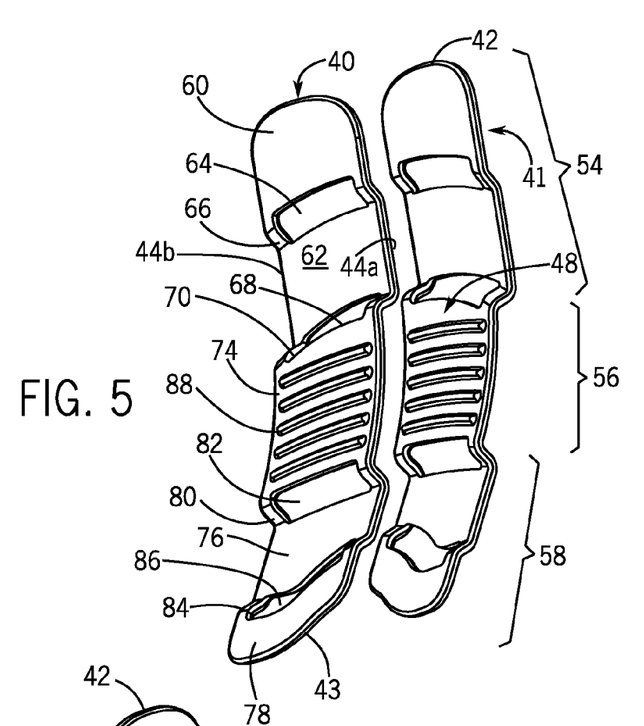
FIG. 5 shows a rear perspective view of the harness cover shown in FIG. 4.

As shown in FIGS. 4 and 5, each harness cover 40 has a body 41 that is generally elongate in shape. The body 41 has a length between an upper free end 42 and a lower free end 43 that are spaced from one another along a lengthwise reference axis A-A of the body 41. The body 41 has two sides 44a, 44b spaced from one another defining a width of the body. The body 41 has a front side 46 and a back side 48 and is thin relative to its length and width as shown in FIG. 6.

Referring to FIG. 4, the harness cover 40 generally has three sections including an upper section 54, a middle section 56, and a lower section 58. The upper section 54 has a first flat region 60 adjacent the upper free end 42 and between the two sides 44a, 44b. The upper section 54 also has a second flat region 62 below and adjacent the first flat region 60 and between the sides 44a, 44b. A first step 66 is positioned between and separates the first and second flat regions 60, 62 from one another. The first step 66 is oriented at an angle relative to a plane of the first flat region 60 and a plane of the second flat region 62. The first step 66 thus positions the first and second flat regions 60, 62 offset or out of plane with one another. As shown in FIG. 6, the plane of the second flat region 62 is stepped forward in a direction toward the front side 46 relative to the plane of the first flat region 60. A first slot 64 is formed through the first step 66 and extends widthwise between the sides 44a, 44b and across a substantial part of the width of the upper section 54.

The middle section 56 is adjacent and below the upper section 54 and forms a third flat region 74. A second step 70 is positioned between and separates the third flat region 74 from the second flat region 62 of the upper section 54. The second step 70 is also oriented at an angle relative to the plane of the second flat region 62 as well as a plane of the third flat region 74. The second step 70 thus positions the second and third flat regions 62, 74 offset or out of plane with one another. The plane of the third flat region 74 is stepped back in a direction toward the back side 48 relative to the plane of the second flat region 62. In this example, the first and third flat regions 60, 74, though not necessarily co-planar with one another, generally lie at about the same elevation relative to one another and in comparison to the elevation of the second flat region 62. A second slot 68 is formed through the second step 70 and extends widthwise between the sides 44a, 44b and across a substantial part of the width of the body 41.

The lower section 58 is adjacent and below the middle section 56 on the harness cover 40. The lower section 58 has a fourth flat region 76 adjacent and below the third flat region 74 and between the sides 44a, 44b. The lower section 58 also has a fifth flat region 78 adjacent and below the fourth flat region 76, between the sides 44a, 44b, and above the lower free end 43 on the body 41. A third step 80 is positioned between and separates the fourth flat region 76 from the third flat region 74. The third step 80 is also oriented at an angle relative to the plane of the third flat region 74 and a plane of the fourth flat region 78. The third step 80 thus positions the third and fourth flat regions 74, 76 offset or out of plane with one another. The plane of the fourth flat region 76 is stepped forward in a direction toward the front side 46 relative to the plane of the third flat region 74. In this example, the second and fourth flat regions 62, 76, though not necessarily co-planar with one another, generally lie at the same elevation relative to one another and in comparison to the elevations of the first and third flat regions 60, 74. A third slot 82 is formed through the third step 80 and extends widthwise between the sides 44a, 44b and across a substantial part of the width of the body 41.

A fourth step 84 is positioned between and separates the fourth and fifth flat regions 76, 78 from one another. The fourth step 84 is also oriented at an angle relative to the plane of the fourth flat region 76 and a plane of the fifth flat region 78. The fourth step 84 thus positions the fourth and fifth flat regions 76, 78 offset or out of plane with one another. The plane of the fifth flat region 78 is stepped back in a direction toward the back side 48 relative to the plane of the fourth flat region 76. In this example, the fifth flat region 78, though not necessarily co-planar with one another, generally lies at the same elevation as the first and third flat regions 60, 74 and in comparison to the elevation of the second and fourth flat regions 62, 76. A fourth slot 86 is formed through the fourth step 84 and also extends widthwise between the sides 44a, 44b and across a substantial part of the width of the lower section 58.

As shown in FIG. 6, a series of ridges 88 protrude from the back side 48 of the middle section 56 of the body 41. The ridges 88 can vary in size, shape, height, location, and orientation and can be on any part of the back side 48 that contacts a seat occupant. In this example, the ridges 88 are perpendicular to the lengthwise axis A-A of the body 41 and are spaced apart from one another on the back side 48 as shown in FIG. 3. The ridges 88 can assist in inhibiting the harness covers 40 from sliding when borne against the chest and shoulders of as seat occupant. The ridges can alternatively have a traction or gripping surface that is textured or otherwise knurled to achieve the same effect.

Figure 7:
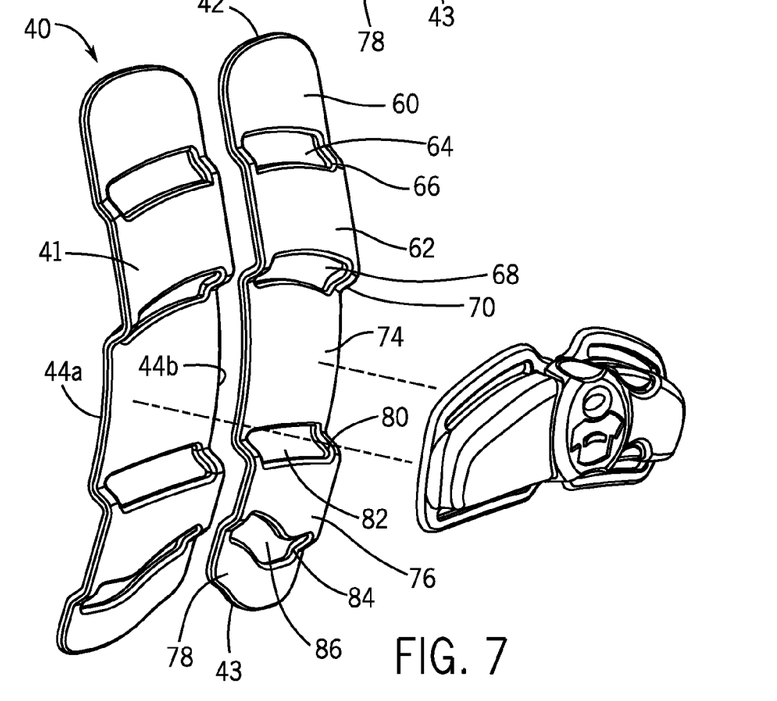
FIG. 7 an exploded front perspective view of the harness cover and the chest clip portions of the harness system shown in FIG. 1.
Figures 8, 9:
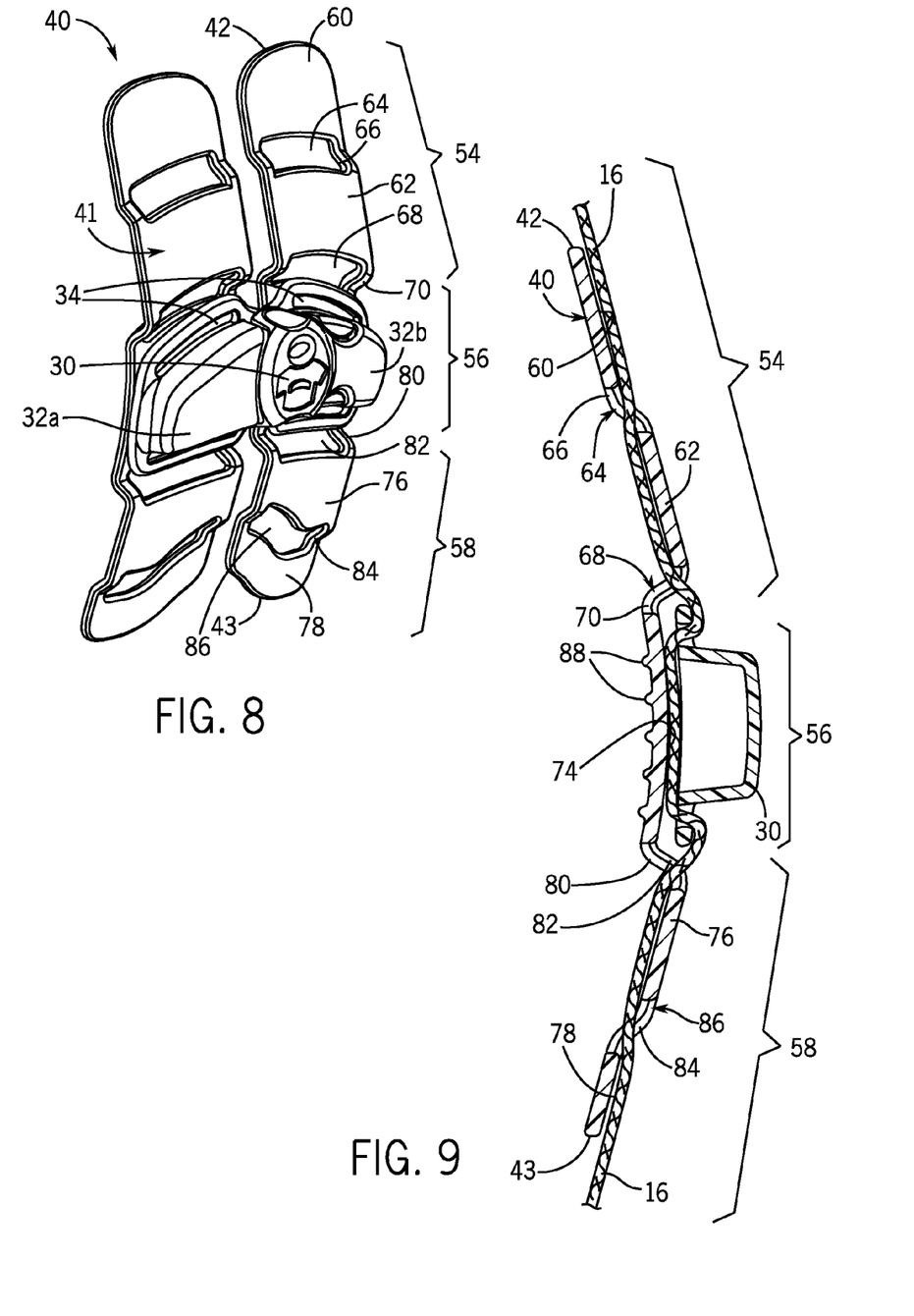
FIG. 8 shows the harness covers and the chest clip shown in FIG. 7 with the chest clip positioned adjacent the harness cover, as during use.
FIG. 9 shows a cross-section taken along line 9-9 of the restraint system shown in FIG. 1.

As shown in FIGS. 7 and 8, the chest clip 30 overlies the middle section 56 on the front side 46 of the body 41. The third flat region 74 of the middle section 56 is sized so that the chest clip 30 nests between the upper and lower sections 54, 58. FIG. 8 shows the relative positioning of the chest clip and the harness cover, specifically, the third flat region 74 of the body 41. Alternatively, each harness cover and the corresponding chest clip part or component can be integrally molded with one another as one piece for the left cover and one piece for the right cover and remain within the teachings of the present invention.

The flat regions need not be true flat, but can be contoured to match the body of a seat occupant. Other parts of the harness cover such as edges, steps, slots, or ends need not be linear. For example, the chest clip 30 can be curved from top to bottom or between the edges, and the harness cover pieces can be curved to match the chest clip contour. As shown in FIGS. 3-5, the slots 64, 68, 82, 86 are oriented generally perpendicular relative to the lengthwise axis of the harness cover 40. Some of the slots, particularly slots 64, 86, can also have a curve, such as a slight S curve in this example, across the width of the cover. The curve can help maintain the positioning of the harness cover 40 relative to the shoulder strap 16.

As shown in FIG. 9, when the harness cover 40 is installed on a restraint system, the upper section 54 is positioned above the chest clip 30 and the lower section 58 is positioned below the chest clip. The shoulder strap 16 passes over the upper free end 42 and first flat region 60 of the body 41 and is threaded through the first slot 64 from the front side 46 to the back side 48. The shoulder strap 16 then passes under the second flat region 62 and is threaded through the second slot 68 from the back side 48 to the front side 46, passing over the third flat region 74. This segment of the shoulder strap 16 is interconnected with one of the two chest clip components 32a, 32b by being threaded through the chest clip slots 34 and underlying the chest clip component. The shoulder strap 16 is then threaded through the third slot 82 from the front side to the back side, and is then positioned on the back side 48 and behind the fourth flat region 76. Finally, the shoulder strap 16 is threaded from the back side 48 to the front side 46 through the fourth slot 86 to overlie the fifth flat region 78 and the lower free end 43 on the front side 46.

The relative contour of the harness cover sections 54, 56, 58 and the positioning and orientation of the slots 64, 68, 82, 86 relative to the contours of the harness cover 40 allow the shoulder strap 16 to pass somewhat straight through the harness cover 40. Therefore, the harness cover 40 fits comfortably on the body of the child properly restrained in the car seat 10 with no lumps or bumps to cause irritation or discomfort. The strap 16 curves slightly as it is threaded through the harness cover as shown in FIG. 9. This can assist in holding the harness cover in a selected position on the strap, and yet allow the cover to move when readjusted as needed.

The shoulder straps 16 are less likely to move relative to the seat occupant with the harness covers 40 in place than without the harness covers. Likewise the chest clip 30 is less likely to move. When the chest clip or the harness covers are properly positioned relative to a seat occupant, the harness covers or chest clip will also be properly positioned. The contour and positioning of the harness cover 40 help to maintain the selected positioning of the chest clip and the chest clip retains the lateral spacing or position of the shoulder straps 16.

The body of the harness cover 40 in this example can be formed of a relatively flexible, but resilient material with a pair of slots both above and below the chest clip 30. The harness cover 40 is an integrally molded structure of a suitably rigid, though somewhat flexible, material. In the present example, the body 41 of the harness cover 40, particularly the back side 48, can be formed of a rubber or rubber-like material or have an exposed surface material having a higher coefficient of friction relative to that of the material of the shoulder strap. The harness cover material thus would be less likely to slide against a child occupant than would the webbing of the shoulder strap.

The parallel, overlapping arrangement of the harness cover 40 and the chest clip 30, in this example increases the friction between the restraint system and the chest and shoulders of the seat occupant. The higher friction enhancing characteristics of the harness cover construction and/or material can help to reduce the amount of movement between the seat occupant and the restraint system. This in turn can help reduce forward movement that a seat occupant might experience at impact during a crash.

Figures 10, 11:
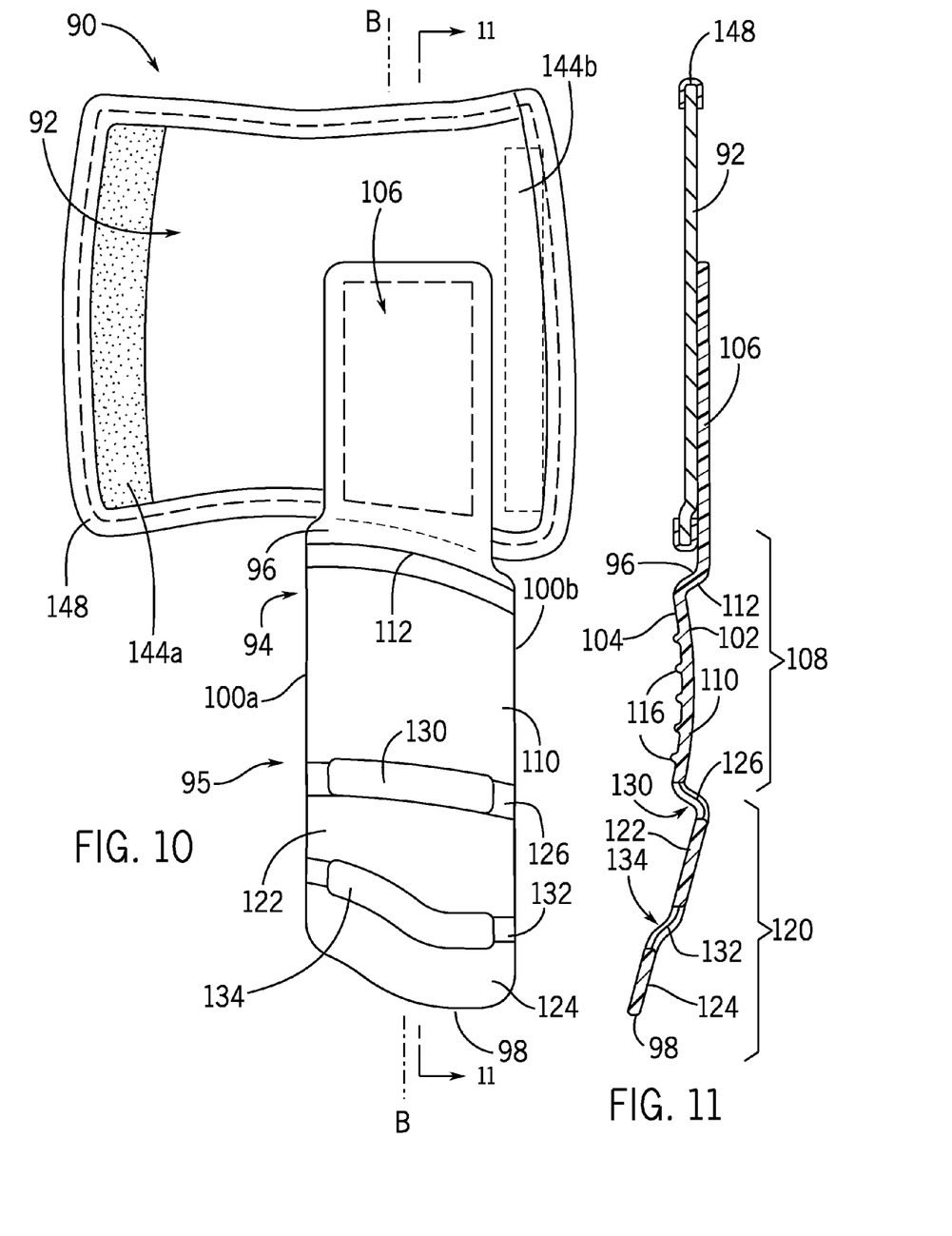
FIG. 10 shows a front view of another example of a harness cover according to the teachings of the present invention.
FIG. 11 shows a cross-section taken along line 11-11 of the harness cover shown in FIG. 10.

FIG. 10 illustrates a second example of a harness cover 90 according to the teachings of the present invention. As shown in FIG. 10, the harness cover 90 has an upper section 92 joined to a lower section 94. The upper section 92 is a generally rectangular soft goods or fabric piece that is in a flat condition when opened as shown in FIG. 10. In this example, the lower section 94 has a body portion 95 with a length defined between a top end 96 and a lower free end 98, and has a width defined between opposed side edges 100a, 100b. As shown in the cross-section of FIG. 11, the body portion 95 has a front side 102 and a back side 104. The body portion 95 is thin relative to its length and width.

FIG. 10 further shows that the lower section 94 includes a tongue 106 that is generally a planar blade protruding from the top end 96 of the body portion 95. The tongue 106 is generally rectangular and is smaller relative to the upper section 92 and the body portion 95. The tongue 106 extends upward relative to a lengthwise axis B-B of the harness cover 90 and overlaps a portion of the upper section 92.

The body portion 95 also includes a middle part 108 that is adjacent and below the tongue 106 and forms a first flat region 110. A first step 112 is positioned between and separates the tongue 106 from the first flat region 110 of the body portion 95. The first step 112 is oriented at an angle relative to the plane of the tongue 106 and the plane of the first flat region 110. The first step 112 thus positions the tongue 106 and the first flat region 112 offset or out of plane with one another. As shown in the cross section of FIG. 11, the plane of the first flat region 110 is stepped back in a direction toward the back side 104 relative to the plane of the tongue 106.

A lower part 120 adjacent and below the middle part 108 on the body portion 95 of the harness cover 90. The lower part 120 has a second flat region 120 adjacent and below the first flat region 110 and between side edges 100a, 100b. The lower part 120 also has a third flat region 124 adjacent and below the second flat region 122, between side edges 100a, 100b, and above the lower free end 98 of the body portion 95. A second step 126 is positioned between and separates the first flat region 110 from the second flat region 122. The second step 126 is also oriented at an angle relative to the plane of the third flat region 124 and a plane of the second flat region 122. The second step 126 thus positions the first and second flat regions 110, 122 offset or out of plane with one another. The plane of the second flat region 122 is stepped forward in a direction toward the front side 102 relative to the plane of the second flat region 122. A first slot 130 is formed through the second step 126 end extends widthwise between the side edges 100a, 100b and across a substantial part of the width of the body portion 95.

A third step 132 is positioned between and separates the second and the third flat regions 122, 124 from one another. The third step 132 is also oriented at an angle relative to the plane of the second flat region 122 and the third flat region 124. The third step 132 thus positions the second and third flat regions 122, 124 offset or out of plane with one another. The plane of the third flat region 124 is stepped back in a direction toward the back side 104 relative to the plane of the second flat region 122. In this example, the third flat region 124, though not necessarily co-planar with one another, generally lies at the same elevation as the first flat region 110 and in comparison to the elevation of the second flat region 122. A second slot 134 is formed through the third step 132 and also extends widthwise between the sides 100a, 100b and across a substantial part of the width of the lower section 120.

Also shown in FIG. 11, the middle part 108 has a series of ridges 116 protruding from the back side 104 of the body portion 95. The ridges 116 can vary in size, shape, height, location, and orientation and can be on any part of the back side 104 that contacts a seat occupant and remain within the teachings of the present invention. In this example, the ridges 116 are perpendicular to the lengthwise axis B-B of the body portion 95, and are spaced apart from one another on the back side 104 as shown in FIG. 11.

Figure 12:
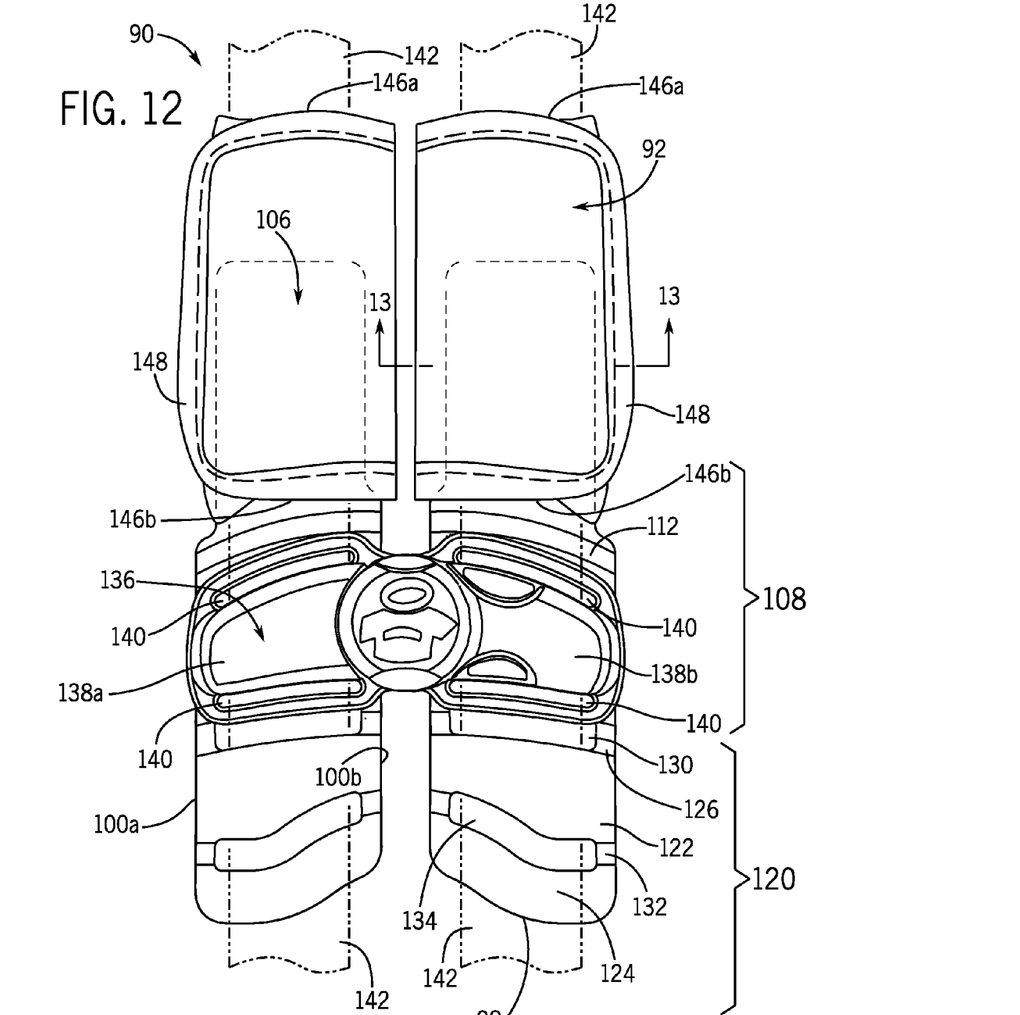
FIG. 12 shows a front view of two of the harness covers shown FIG. 10 and installed on a restraint system.

As shown in FIG. 12, a chest clip 136 overlies the middle part 108 on the front side 102 of the body portion 95. The first flat region 110 of the middle part 108 is sized so that the chest clip 136 nests between the lower part 120 of the lower section 94 and the upper section 92. The chest clip 136 further has two chest clip components 138a, 138b, each carried on a respective one of the shoulder straps 142. The components 138a, 138b each have one end that can attach to and detach from a mating part of the other component. Each chest clip component 138a, 138b has chest clip slots 140 on non-attachable ends so that each respective chest clip component 138a, 138b can be interconnected with a respective shoulder strap 142.

Figure 13:
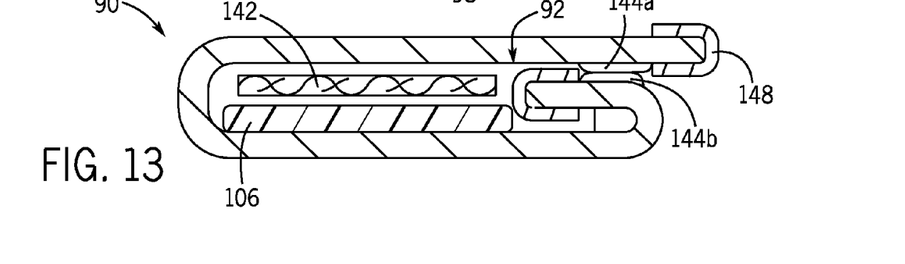
FIG. 13 shows a cross-section of one of the harness covers taken along line 13-13 of restraint system shown in FIG. 12.

The tongue 106 joins the upper section 92 to the lower section 94 and is positioned offset to one side of the upper section. The tongue 106 can be situated under the soft goods on a backside of the tube, over the soft goods on a front side, on the inside of the tube, or between the soft goods layers of the upper section 92 when the two parts are to be joined and remain within the teachings of the present invention. The upper section 92 can be opened to a flat condition as shown in FIG. 10. The upper section 92 can be folded or rolled and secured in a tubular shape as shown in the cross-section of FIG. 13. In this example, the upper section 92 has a first fastener 144a that attaches to a corresponding second fastener 144b on an opposite side of the upper section 92. The fastener in this example is a hook and loop fastener, such as Velcro® or the like. However, the fastening mechanism can be any suitable fastener and remain within the teachings of the present invention.

When in a tubular configuration, the upper section 92 is a tube and has two openings 146a, 146b oriented to align with the lengthwise axis B-B of the body 94. As shown in FIG. 12, when installed the upper section 92 is positioned above the chest clip 136 and the lower part 120 is positioned below the chest clip 136. The shoulder strap 142 is threaded first through the tube openings 146a, 146b of the upper section 92, and over the tongue 106, which lies inside the tubular upper section 92. The tube of the upper section 92 can become flattened by the flat strap configuration and strap pressure when the shoulder strap 142 is a received therethrough as shown in FIG. 12. The shoulder strap 142 exits the tube and is threaded through the chest clip slots 140 and underlies the chest clip components 138a, 138b. The shoulder strap 142 next passes through the first slot 130 from the front side 102 to the back side 104 of the body portion 95 and underlies the second flat region 122. Finally, the shoulder strap 142 passes through the second slot 134 from the back side 104 to the front side 102 and overlies the third flat region 124 and the lower free end 98.

The body portion 95 can be an integrally molded structure of a flexible, resilient, but somewhat rigid material compared with that of the soft goods of the upper section 92. The second slot 134 has a slight S curve, similar to that of the first example. The ends of the first and second slots 130, 134 are spaced sufficiently from the side edges 100a, 100b of the body portion 95 to make the integrally molded structure sturdy and durable.

In this example, the tongue 106 of the lower section 94 and the fabric of the upper section 92 are sewn to one another. Nonetheless, any appropriate method of joining the upper section 92 and the lower section 94 to one another such as suitable types of adhesives may be used and remain within the teachings of the present invention.

The upper section 92 can be made of a fabric such as neoprene, polyester, cotton, or any other suitable fabric. The soft goods piece can also be quilted or padded and include multiple layers. The fabric can be chosen for comfort, cushioning, strength, and resiliency. The edges of the upper section 92 soft goods as shown can have a fabric binding 148. The binding fabric can be nylon, polyester, cotton, or the like. A sewn, soft goods cylinder can form the flattened tube of the upper section 92, eliminating the need for the fastening mechanism. In either case, the upper section 92 can have a rubber or gripping material surface applied to a fabric material in order to bear against the child occupant.

The upper section 92 can also be a non-fabric, continuous tube of material requiring no fastener. Regardless of the construction of the tube of the upper section 92, the shoulder strap 142 passes though the tube in order to interconnect the harness cover 90 to the shoulder strap.

The harness covers, or portions thereof, disclosed herein can be integrally molded as unitary structures from any suitable material, such as a plastic, rubber or rubber-like material. The harness covers can be made from any suitable material, such as a urethane material and can be fabricated from any suitable process, such as injection molding or the like. In one example, a material can have suitable friction and/or surface characteristics created by a material having a 60 durometer Shore A hardness. In another example, the harness covers can be made from a thermoplastic elastomer (TPE) material or the like. Other examples of harness cover shapes and configurations are within the spirit and scope of the present invention.

The restraint system and disclosed harness cover can be designed to be used in a variety of orientations and with children within a range of sizes. The disclosed harness covers can be designed to be used with either end oriented upward and thus can have a somewhat symmetrical shape, if desired.

Additionally, a harness restraint system similar to that shown and described above can have a decorative fabric sleeve, cap, or covering added over the outside of the entire harness cover. If desired, a soft goods covering could mask the harness covers and/or the chest clip to improve the aesthetic appearance of the restraint system during use. The addition of such a cap or covering would not interfere with the function or adjustment of the restraint system and harness covers. The rubber-like base material of the harness cover can still contact the harness webbing and the child. Such a cap or covering could be separate and selectively removable from and attachable to the child restraint system. Alternatively, an end of each cap or covering could be anchored to some part of the child restraint system. The base harness cover can be made relatively inexpensively with limited surface finishing in such an example because the outward appearance can be hidden by and improved with the covering giving the visible outward surfaces a fashionable look.

Although certain child restraint system features, functions, and harness covers have been described herein in accordance with the teachings of the present disclosure, the scope of coverage of this disclosure is not limited thereto. On the contrary, this disclosure covers all embodiments of the teachings of the disclosure that fairly fall within the scope of permissible equivalents.

What is claimed is:

1. A harness system for use with a child seating device, the harness system comprising:
   a shoulder strap;
   a chest clip carried by the shoulder strap; and
   a harness cover with a front side, a back side, an upper section coupled to the shoulder strap and positioned above the chest clip, a middle section positioned below the upper section, a lower section coupled to the shoulder strap and positioned below the chest clip, and one pair of slots spaced from one another,
   wherein the shoulder strap is positioned against the front side of the harness cover along the middle section, passes through one slot of the one pair of slots from the front side to the back side, passes through the other slot of the one pair of slots from the back side to the front side, and is positioned against the back side of the harness cover between the pair of slots.

2. A harness system according to claim 1, wherein the harness cover is lengthwise adjustable along the shoulder strap with the chest clip.

3. A harness system according to claim 1, wherein the harness cover has a second pair of slots spaced from one another in the upper section above the chest clip and wherein the one pair of slots are in the lower section below the chest clip, and wherein the shoulder strap passes through the second pair of slots from the front side to the back side to the front side.

4. A harness system according to claim 3, wherein the middle section is between the second pair of slots in the upper section and the one pair of slots in the lower section, the middle section being sized so that the chest clip nests between the upper and lower sections.

5. A harness system according to claim 1, wherein the back side of the harness cover includes an exposed grip enhancing surface.

6. A harness system according to claim 1, wherein a portion of the back side of the harness cover includes a plurality of ridges protruding therefrom.

7. A harness system according to claim 1, wherein the harness cover is an integrally molded structure.

8. A harness system according to claim 1, wherein the upper section is a tube, the shoulder strap being threaded through the tube.

9. A harness system according to claim 8, wherein the tube is a fabric material and can be opened to a flat condition and folded or rolled and secured to form the tube.

10. A harness system according to claim 8, wherein the lower section is an integral molded structure having an end opposite the one end, wherein the one pair of slots are spaced from one another and located between the one end and the opposite end, the shoulder strap being threaded through the one pair of slots.

11. A harness system according to claim 10, wherein the upper section is a fabric tube and the lower section has a tongue sewn to the fabric tube.

12. A harness system according to claim 1, wherein the harness cover and a part of the chest clip are integrally molded with one another.

13. A harness system according to claim 1, further comprising:
   a pair of the shoulder straps; and
   two of the harness covers, one coupled to each of the pair of shoulder straps.

14. A harness system according to claim 1, wherein the child seating device is a child's car seat.

15. A child restraint system for use with a child car seat, the restraint system comprising:
   two shoulder straps;
   a chest clip having two components attached to and separable from one another, one of the two components coupled to each of the two shoulder straps; and
   two harness covers each having a front side, a back side, an upper section coupled to a respective one of the two shoulder straps above the chest clip, a middle section underlying the chest clip, and a lower section coupled to the respective shoulder strap below the chest clip, each lower section having a first lower flat region, a second lower flat region, and a pair of slots spaced from one another,
   wherein, for each harness cover, the respective shoulder strap is positioned against a front side of the middle section on the corresponding harness cover, passes through one slot of the pair of slots from the front side to the back side in the first lower flat region, and passes through the other slot of the pair of slots from the back side to the front side in the second lower flat region.

16. A child restraint system according to claim 15, wherein each upper section is a tube and is joined to one end of the respective lower section, the respective shoulder strap being threaded through the tube.

17. A child restraint system according to claim 16, wherein each tube is formed from a fabric material strip with opposed ends that can be separated from one another and joined to one another by a fastening mechanism to form the tube.

18. A child restraint system according to claim 16, wherein each lower section is an integral molded structure having an end opposite the one end, the pair of slots spaced from one another and located between the one end and the opposite end.

19. A child restraint system according to claim 15, wherein each of the harness covers is an integrally molded structure.

20. A child restraint system according to claim 19, wherein each of the harness covers has a plurality of ridges integrally molded on a part of the back side of the harness cover.

* * * * *